UNITED STATES PATENT OFFICE.

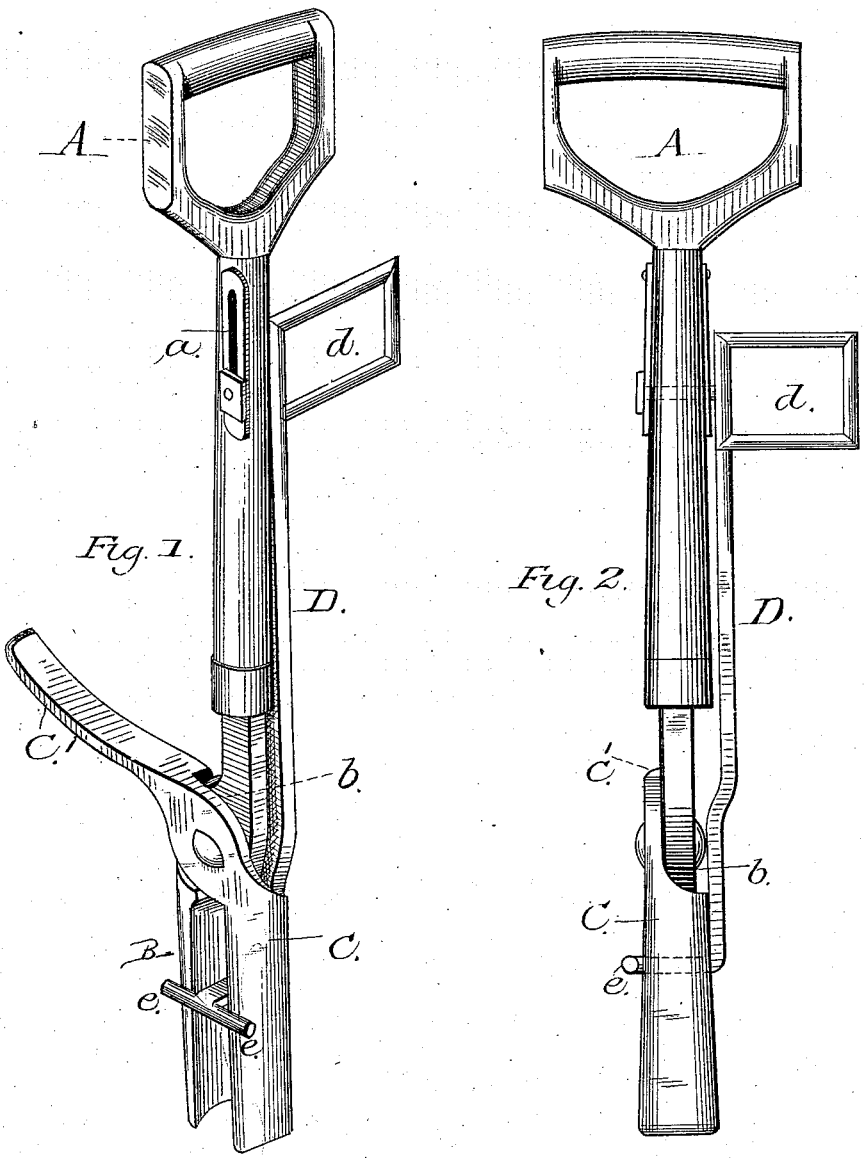

JOHN D. HIGINBOTHAM AND GEORGE F. BALL, OF ADRIAN, MICHIGAN.

WEED-PULLER.

SPECIFICATION forming part of Letters Patent No. 287,677, dated October 30, 1883.

Application filed July 27, 1883. (No model.)

*To all whom it may concern:*

Be it known that we, JOHN D. HIGINBOTHAM and GEORGE F. BALL, citizens of the United States of America, residing at Adrian, in the county of Lenawee and State of Michigan, have invented certain new and useful Improvements in Weed-Pullers; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in weed pullers or extractors, its object being to provide an implement which will remove the roots, as well as the portion above ground, of weeds, the same implement being adapted to be used in transplanting bulbs, flowers, &c.; and our invention consists in providing an implement with a pair of blades, one of said blades being provided with an upright handle, the other blade having a portion projecting at substantially right angles to the blade to which it is attached; also, in providing the blades and handle with a pusher-rod, which is secured to the handle and extends between the blades for the purpose of ejecting the root from between the jaws, as will be hereinafter more fully set forth, and pointed out in the claims.

In the accompanying drawings, which illustrate our invention, Figure 1 is a perspective view, and Fig. 2 is a side view.

A represents the handle of our improved implement, which is provided at an intermediate portion below the grasping cross-bar with a slot, *a*, which extends through the handle on a line with the cross-bar. This slot may be provided on each side with a suitable metal plate, as shown. The lower end of this handle is provided with a suitable ferrule, as is usual in this class of agricultural implements.

The jaw B is concave in cross-sections, and is provided with an enlarged portion, *b*, from which upwardly projects a suitable tang, by means of which the jaw B is secured to the handle.

C represents a similarly-constructed jaw, which is also provided with an enlarged portion, from which projects, substantially at right angles to the jaw B, the portion C′, as shown in the accompanying drawings. These parts are pivotally connected to each other.

D represents what we term a "pusher-rod," which is provided with a handle, *d*, from the inner side of which projects a suitable pin, which passes through the slot *a* in the handle A. This rod D projects downwardly, and is bent at right angles at its lower portion, so as to pass between the jaws B and C. This portion of the pusher-rod which lies between the jaws is flattened, and it is provided at its end with a cross-bar, *e*, which serves to secure the same from lateral displacement.

The construction of our invention will be fully understood from the accompanying drawings, and we deem a further description of the same unnecessary.

When it is desired to utilize this implement for the purpose of removing weeds or as a transplanter, the same is held vertically over the root to be removed. The projecting portion C′ of the pivoted jaw C will hold said jaw open, and the same may be pressed into the ground over the root by placing the foot of the operator upon said lever, and at the same time pressing downwardly upon the handle A. Thus the jaws will be forced into the ground and surround the root. In order that these jaws may be more readily forced into the ground, the lower ends of the same are shortened, and they taper upwardly. After the implement has been passed over a root, as hereinbefore described, and it is desired to remove the same from the ground, the handle A, to which the jaw B is rigidly attached, is inclined or bent toward the end of the projection C′, thus causing the jaws to be compressed upon the root, and a further depression of the handle causes the implement to be removed from the ground, thus carrying with it the root over which it has been placed. When it is desirable to eject the earth and root from the jaws, the pusher-rod D is forced downwardly, which will cause the jaws to open, and at the same time will push therefrom the roots.

It will be seen from the foregoing that this invention is extremely simple in construction and operation, and that there are no parts to get out of order.

If desirable, a small spring may be inserted in the slot *a* of the handle, under the pin that projects through the same, for the purpose of holding the pusher-rod D with its foot against the upper part of the jaws, though this is not absolutely necessary, as when the implement is pressed in the ground this rod will slide upward.

Having thus described our invention, we reserve the right to modify the same within the scope of our claim, without departing from the spirit of our invention.

What we claim as new, and desire to secure by Letters Patent, is—

1. In a weed-puller or transplanter, the jaw B, provided with an upwardly-projecting handle, A, and jaw C, with a portion, C', formed thereon, and extending at substantially right angles therewith, the parts being pivotally connected to each other, and a pusher-rod attached to the handle, and provided with a bent end which projects between the jaws, substantially as shown.

2. In combination with the jaw B, provided with an upwardly-projecting handle, A, the jaw C, with a sidewise-projecting portion, C', the parts being pivoted to each other and provided with a pusher-rod, D, secured to the handle within a longitudinal slot at its upper end, and extending between the jaws, substantially as shown, and for the purpose set forth.

3. In a weeding and transplanting implement, the single handle A, provided with a longitudinal slot, a, at its upper end, and having attached at its lower end a concave jaw, B, in combination with the jaw C, having the sidewise-projecting portion C', the parts being pivoted to each other, and presser-bar D, attached to the handle by a transverse bolt, said bar being bent at its lower end, so as to pass between the jaws, and provided at its end with a cross-bar, e, the parts being organized substantially as shown.

In testimony whereof we affix our signatures in presence of two witnesses.

JOHN D. HIGINBOTHAM.
GEORGE F. BALL.

Witnesses:
JACOB C. WINNIE,
GRANT A. ROGERS.